United States Patent [19]

Hirai

[11] Patent Number: 5,123,331
[45] Date of Patent: Jun. 23, 1992

[54] STABILITY COMPENSATING CIRCUIT OF ACTUATOR SYSTEM

[75] Inventor: Masanori Hirai, Gifu, Japan

[73] Assignee: Teijin Seiki Co., Ltd., Osaka, Japan

[21] Appl. No.: 656,467

[22] Filed: Feb. 19, 1991

[30] Foreign Application Priority Data

Feb. 26, 1990 [JP] Japan .................................. 2-45312

[51] Int. Cl.⁵ .................................................. F15B 9/03
[52] U.S. Cl. .................................... 91/363 A; 91/459
[58] Field of Search ................. 91/361, 362, 363 R, 91/363 A, 459, 1; 60/911; 318/611, 623

[56] References Cited

U.S. PATENT DOCUMENTS

| | | | |
|---|---|---|---|
| 3,874,407 | 4/1975 | Griswold | 91/459 |
| 3,914,585 | 10/1975 | Wilhelm, Jr. et al. | 364/471 |
| 4,636,700 | 1/1987 | Moore et al. | 318/611 |
| 4,790,233 | 12/1988 | Backe et al. | 91/361 |
| 4,840,111 | 6/1989 | Garnjost | 91/459 |

FOREIGN PATENT DOCUMENTS

| | | | |
|---|---|---|---|
| 0075507 | 3/1983 | European Pat. Off. | 91/363 R |
| 0947822 | 7/1982 | U.S.S.R. | 318/611 |

*Primary Examiner*—Edward K. Look
*Assistant Examiner*—Hoang Nguyen
*Attorney, Agent, or Firm*—Lane Aitken & McCann

[57] ABSTRACT

In a stability compensating circuit of an actuator system which has an actuator that is actuated in response to an input signal and has an object to be controlled by the actuator and includes a vibrational component and wherein the stability of the actuator system is compensated by controlling a deviation signal between the input signal to the actuator and a feedback signal from the actuator, the improvement comprising a moving average filter for averaging the deviation signals to the actuator at intervals of a moving average time of the filter.

15 Claims, 5 Drawing Sheets

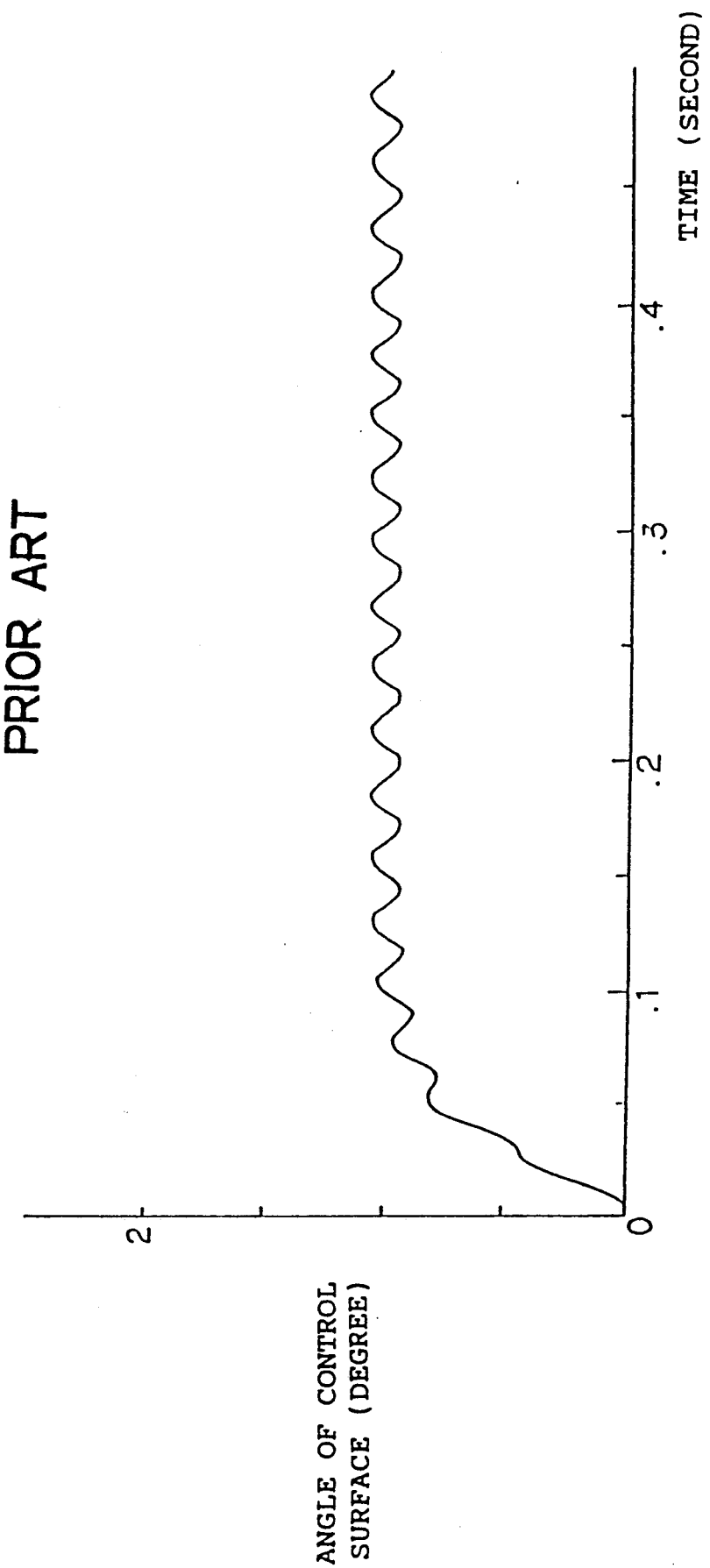

STABILITY COMPENSATING CIRCUIT OF ACTUATOR SYSTEM

FIELD OF THE INVENTION

The present invention relates in general to a stability compensating circuit of an actuator system, and in particular to such a circuit of an actuator system in which a discrete control of the system including a secondary vibrational term is performed.

DESCRIPTION OF THE PRIOR ART

In actuator systems in the flight control of aircraft and the like, it is extremely difficult to ensure stability at the time of high response, because the actuator system includes a secondary vibrational term (vibrational component) due to the influence of a mass system in the actuator system. Therefore, in cases where the actuator system requires high response, an additional stability compensating circuit is provided in the control loop.

A conventional actuator system of the kind described above is shown in FIG. 6. Reference numeral 1 is a hydraulic actuator, and reference numeral 2 is a control surface (rudder, elevator, ailerons and flaps of aircraft). The actuation of the control surface 2 is performed by axially moving an output rod $1a$ of the hydraulic actuator 1 which is supported on an airframe 3. Reference numeral 4 denotes a control valve such as a servo valve, which varies a hydraulic pressure of the hydraulic actuator 1 according to an input signal from the flight control part of an aircraft and actuates the hydraulic actuator 1. The actuator system shown in FIG. 6 can be converted to a dynamical model such as that shown in FIG. 7. In the prior art, a notch filter having a characteristic value equal to a resonance frequency of the system of FIG. 7 is inserted into the control loop of the actuator 1, and the stability of the system is compensated by cancelling out a peak of the secondary vibrational term by this notch filter.

However, in the above described conventional stability compensating circuit in the actuator system, the resonance frequency of the notch filter does not coincide with the resonance frequency of the actuator system to be controlled, in cases where the resonance frequency of the actuator system tends to vary or only an approximate value of the resonance frequency is known. Consequently, vibrational elements of the resonance frequency of the secondary vibrational term appear, as shown in the step response test results of FIG. 8. As a result, there is the drawback that the stability of the actuator system cannot be ensured.

It is therefore an object of the present invention to provide a novel stability compensating circuit of an actuator system which is capable of compensating the stability of the actuator system wherein only an approximate value of the resonance frequency of the system is known.

SUMMARY OF THE INVENTION

In a stability compensating circuit of an actuator system which has an actuator that is actuated in response to an input signal and has an object to be controlled by the actuator and includes a vibrational component and wherein the stability of the actuator system is compensated by controlling a deviation signal between the input signal to the actuator and a feedback signal from the actuator, the stability compensating circuit according to the present invention comprises a moving average filter for averaging the deviation signals to the actuator at intervals of a moving average time of the filter. The actuator may comprise a hydraulic cylinder. The actuator may also comprise an electrically driven actuator. The object to be controlled may be a control surface of an aircraft. The moving average time of the filter is a predetermined time substantially equal to or more than a vibration period of the actuator system at the time of resonance. The moving average filter has a transmission characteristic expressed by the following equation:

$$Y = \frac{1 + z^{-1} + \ldots + z^{-M+1}}{M} X$$

where Y is a filter output, X is a filter input, z is an operator and M is the number of data to be used in the moving average.

In the present invention, the deviation signals to the actuator are averaged at intervals of a predetermined time substantially equal to or more than a vibration period of said actuator system at the time of resonance. Consequently, even when only an approximate value of the resonance frequency of the actuator system to be controlled is known, a peak of the secondary vibrational term of the system is cancelled out and the stability of the actuator system thus ensured.

In accordance with another important aspect of the present invention, there is provided a stability compensating circuit of an actuator system including an actuator connected to an object to be controlled and a secondary vibrational term, comprising means to generate a command signal, means to generate a deviation signal from the sum of the command signal and a feedback signal from the actuator, and a digital filter to which the deviation signal is inputted and which averages the deviation signals at intervals of a moving average time of the filter, the averaged deviation signal being supplied to the actuator so that the stability of the actuator system is compensated. The stability compensating circuit of an actuator system according to the present invention may further comprise a digital-to-analog converter provided between the digital filter and the actuator, the digital-to-analog converter converting the averaged deviation signal into an analog signal which is supplied to the actuator.

BRIEF DESCRIPTION OF THE DRAWINGS

The drawbacks of a conventional stability compensating circuit of an actuator system and the features and advantages of a stability compensating circuit of an actuator system according to the present invention will be more clearly understood from the following description taken in conjunction with the accompanying drawings:

FIG. 8 is a graph showing the step response test results of the model shown in FIG. 7.

DESCRIPTION OF THE PREFERRED EMBODIMENTS

Figure 1:
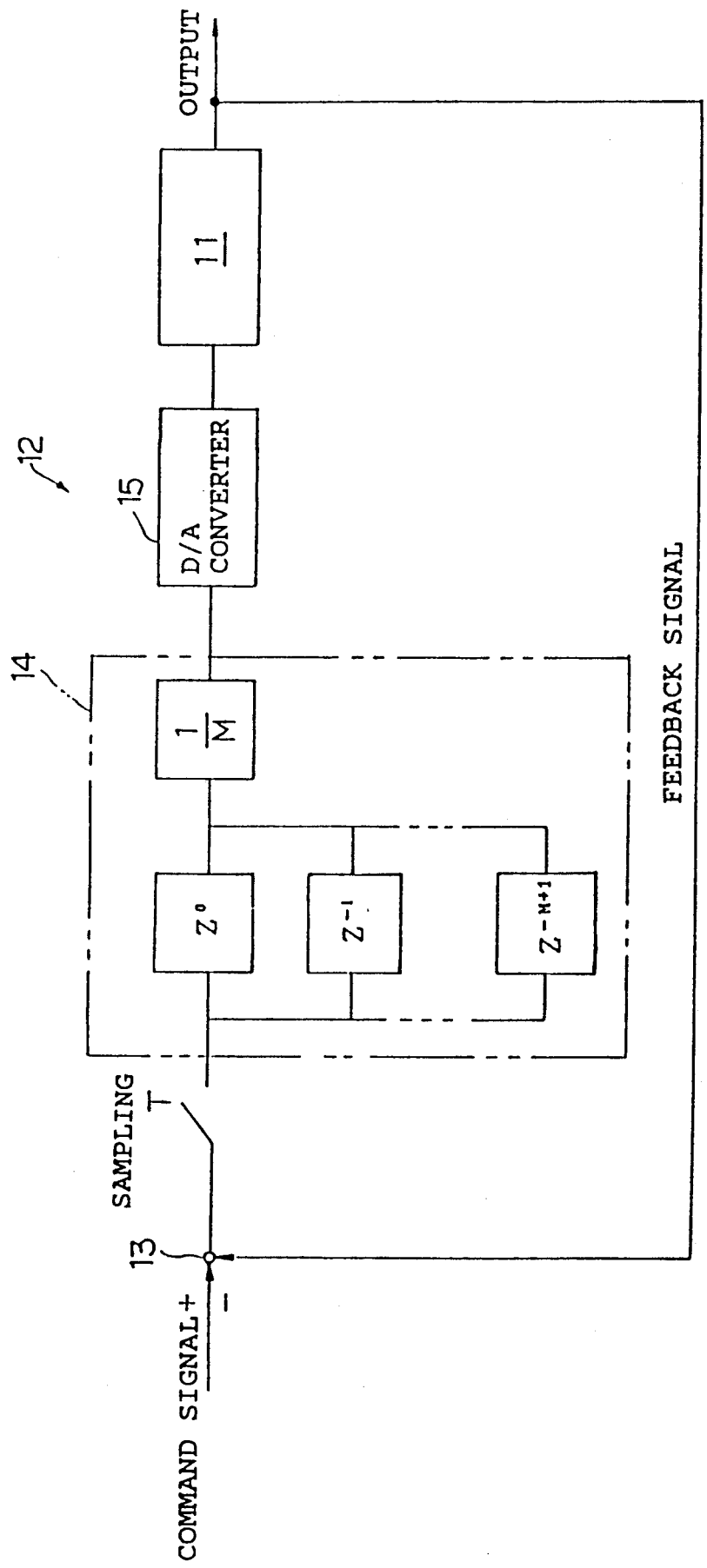
FIG. 1 is a block diagram illustrating a stability compensating circuit according to the present invention which may be used in an actuator system that controls the control surfaces of aircraft.

Referring to FIG. 1, there is shown a preferred embodiment of a stability compensating circuit in accordance with the present invention, which may be used in an actuator system for controlling the control surfaces (rudder, elevator, ailerons and flaps) of aircraft. Reference numeral 11 denotes a servo actuator that is actuated in response to a hydraulic or electrical input signal. For example, the servo actuator comprises a hydraulic cylinder that is controlled by an electro-hydraulic servo valve. The hydraulic cylinder 11 is connected at its one end with the control surface of an aircraft (not shown) to be controlled and at the other end with the airframe of the aircraft (not shown). As a result, the hydraulic cylinder 11 constitutes an actuator system for controlling the control surface of an aircraft. This actuator system includes a secondary vibrational term (vibrational component) due to the influence of a mass system in the hydraulic power transmission system of the hydraulic cylinder 11, and a control loop 12 is formed so that the stability of the system is maintained without undergoing the resonance influence of the secondary vibrational term.

The control loop 12 comprises a digital filter 14 in which a deviation signal from a point 13 is inputted with a sampling period T. At the point 13, a command signal (input signal) from an external flight control part and a feedback signal such as a control-surface angle signal of the control surface described above are summed to produce the deviation signal. The control loop 12 further comprises a digital-to-analog converter 15 which converts the digital output of the digital filter 14 to the amount of analog (e.g., analog output to the electro-hydraulic valve) and also holds it for a predetermined time. By the digital filter 14 and digital-to-analog converter 15, the deviation signal to the hydraulic cylinder 11 (electro-hydraulic valve) is controlled. The digital filter 14 has a function as a moving average filter and has a transmission characteristic expressed by the following equation:

$$Y = \frac{1 + z^{-1} + \ldots + z^{-M+1}}{M} X$$

where Y is a filter output, X is a filter input, z is an operator and M is the number of data to be used in the moving average. The moving average time of the digital filter 14 (M times sampling period T) is a predetermined time substantially equal to or more than the vibration period at the time of resonance of the secondary vibrational term that is included in the actuator system. For example, the lower limit of the moving average time is equal to the vibration period divided by 1.2. The deviation signals to the hydraulic cylinder 11 are averaged at intervals of the moving average time by means of the digital filter 14. The averaged deviation signal is supplied to the hydraulic cylinder 11 so that the stability of the actuator system can be compensated.

Figure 2:
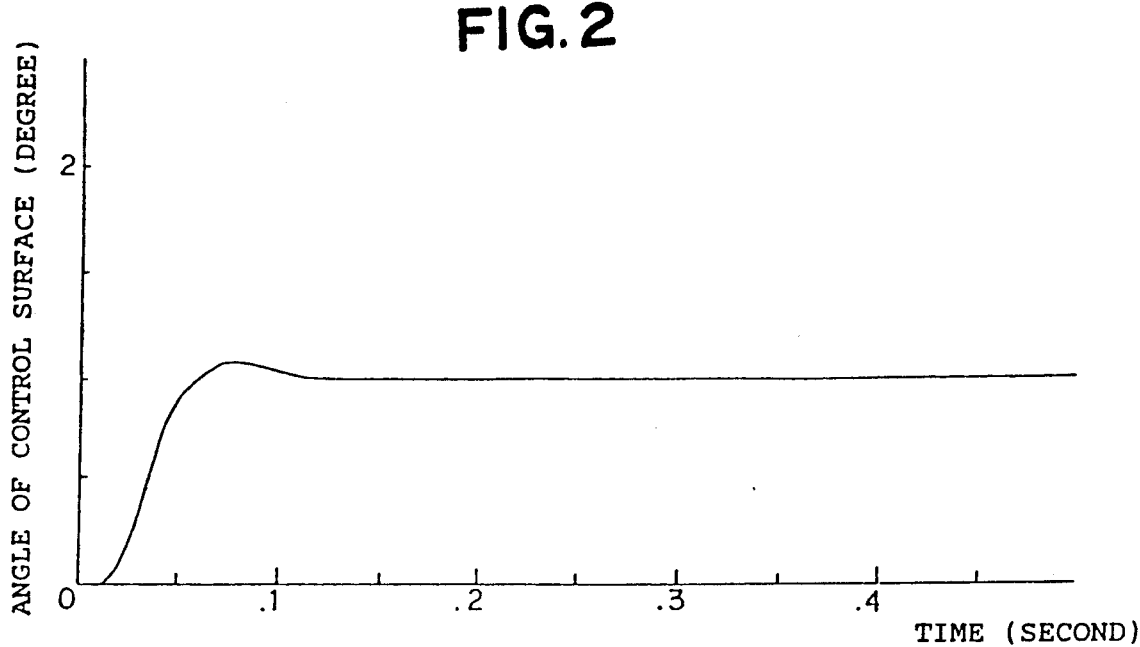
FIG. 2 is a graph showing step response test results of the stability compensating circuit of FIG. 1 when the moving average time of the digital filter of FIG. 1 is equal to the vibration period at the time of resonance of a secondary vibrational term that is included in the actuator system.
Figure 3:
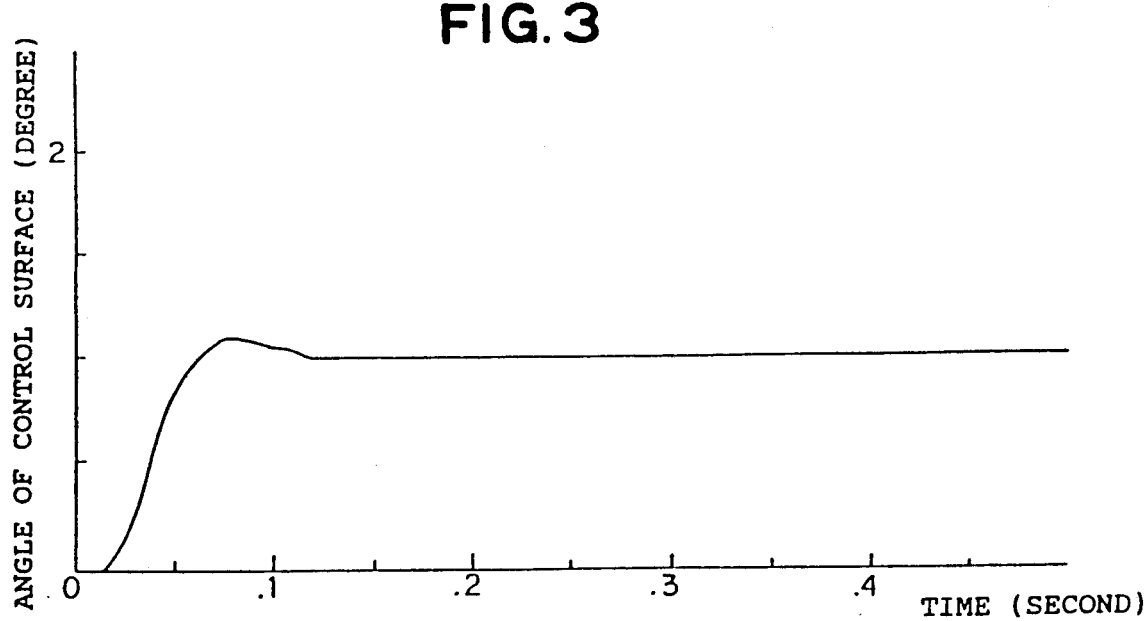
FIG. 3 is a graph showing the step response test results when the moving average time of the digital filter is equal to the vibration period times 0.9.
Figure 4:
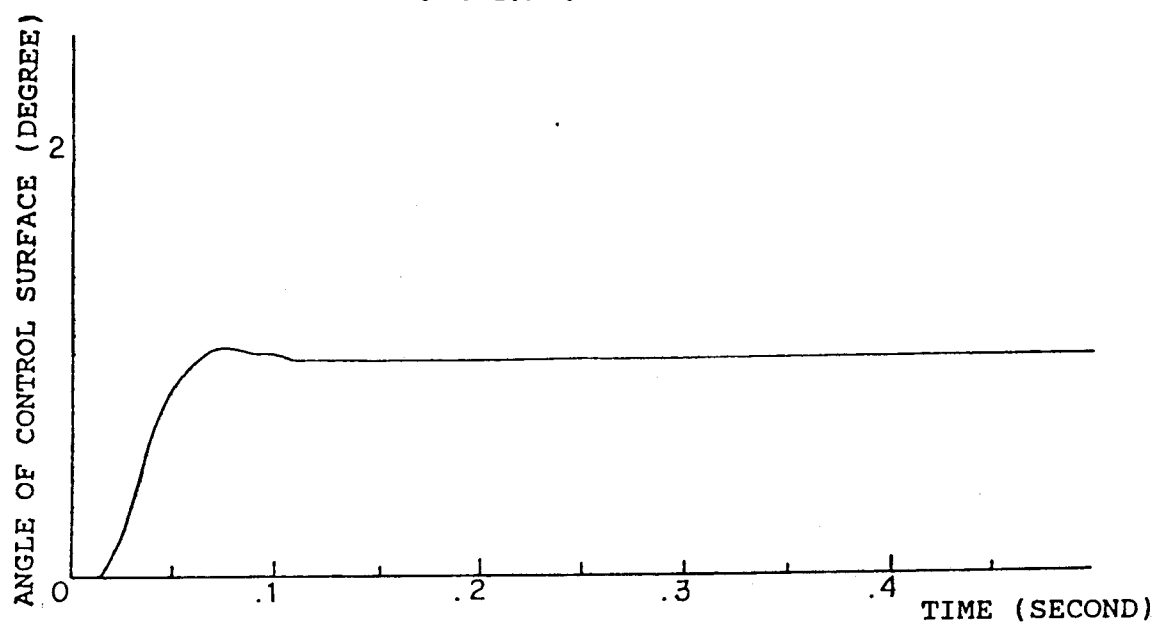
FIG. 4 is a graph showing the step response test results when the moving average time of the digital filter is equal to the vibration period times 1.1.
Figure 5:
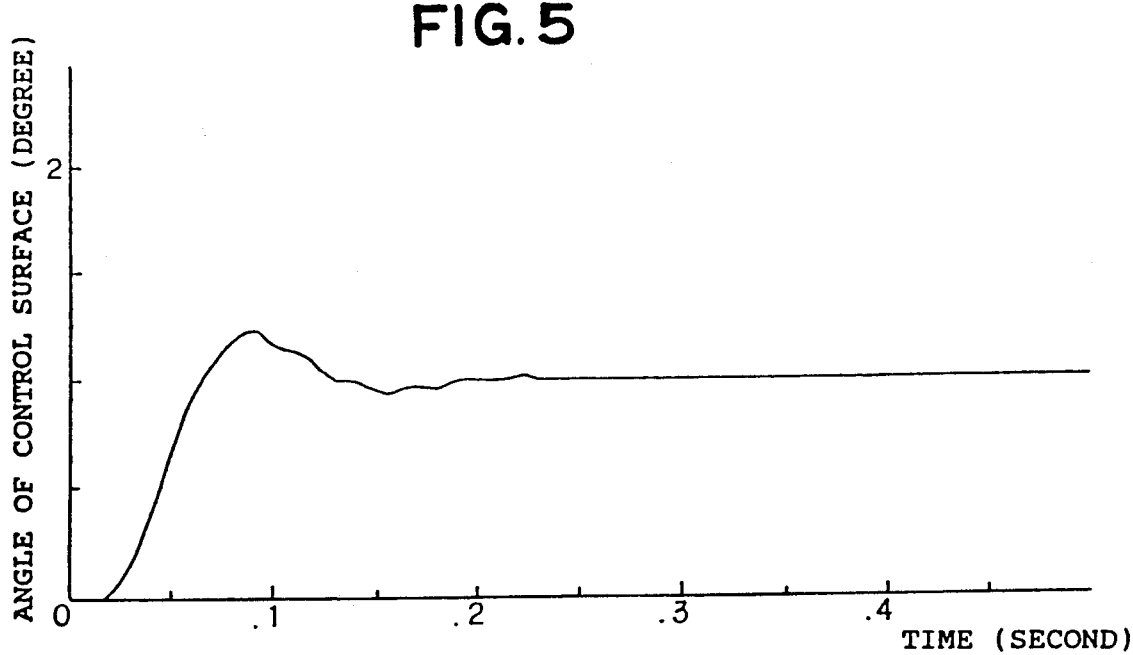
FIG. 5 is a graph showing the step response test results when the moving average time of the digital filter is equal to the vibration period times 0.7.
Figure 6:
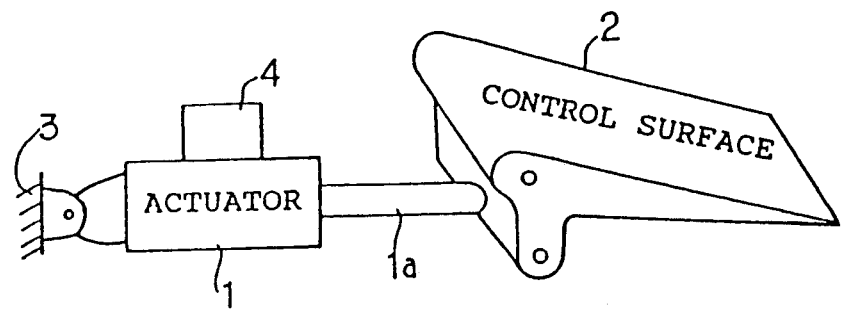
FIG. 6 is a schematic view illustrating a conventional actuator system that is used in the flight control of an aircraft.
Figure 7:
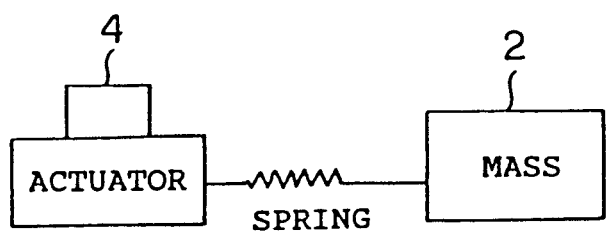
FIG. 7 schematically illustrates a dynamic model that is equivalent to the actuator system of FIG. 6.

FIG. 2 shows step response test results with time in second taken on the abscissa and the angle of the control surface in degree taken on the ordinate. In this case, the moving average time of the digital filter 14 is equal to the vibration period described above. It will be seen from FIG. 2 that a stable response is obtained. FIG. 3 shows step response test results when the moving average time of the digital filter 14 is equal to the vibration period times 0.9. FIG. 4 shows step response test results when the moving average time of the digital filter 14 is equal to the vibration period times 1.1. FIG. 5 shows step response test results when the moving average time of the digital filter 14 is equal to the vibration period times 0.7. As shown in FIGS. 3 and 4, a satisfactory response characteristic can be obtained. That is to say, if in the present invention an approximate value of the resonance frequency of the actuator system is known, the stability of the system including the secondary vibrational term can be ensured. Even in a case where the resonance frequency tends to vary, a stable and robust stability compensating circuit can be provided.

While it has been described that the actuator comprises a hydraulic cylinder, it is noted that it may also comprise an electrically driven actuator.

According to the present invention, the deviation signals to the actuator are averaged at intervals of a predetermined time substantially equal to or more than a vibration period of said actuator system at the time of resonance. Consequently, even when only an approximate value of the resonance frequency of the actuator system to be controlled is known, a peak of the secondary vibrational term of the system is cancelled out and the stability of the actuator system thus ensured.

Although the invention has been described with a certain degree of particularity, it is understood that the present disclosure has been made only by way of example and that numerous changes in the details of the construction and the combination and arrangement of parts may be made without departing from the scope of the invention as hereinafter claimed.

What is claimed is:

1. In a stability compensating circuit of an actuator system which has an actuator that is actuated in response to a input signal inputted to summing means and has an object to be controlled by said actuator and includes a vibrational component and wherein the stability of said actuator system is compensated by controlling loop signals in a closed loop between said actuator and said summing means, the improvement comprising a moving average filter for averaging said loop signals at intervals of a moving average time of said filter, said moving average time being in the vicinity of a vibration period of said actuator system at the time of resonance.

2. A stability compensating circuit as set forth in claim 1, wherein said actuator comprises a hydraulic cylinder.

3. A stability compensating circuit as set forth in claim 1, wherein said actuator comprises an electrically driven actuator.

4. A stability compensating circuit as set forth in claim 1, wherein said object to be controlled is a control surface of an aircraft.

5. A stability compensating circuit as set forth in claim 1, wherein said moving average time of said filter is a predetermined time substantially equal to a vibration period of said actuator system at the time of resonance.

6. A stability compensating circuit as set forth in claim 1, wherein said moving average time of said filter is a predetermined time more than a vibration period of said actuator system at the time of resonance.

7. A stability compensating circuit as set forth in claim 1, wherein said moving average filter has a transmission characteristic expressed by the following equation:

$$Y = \frac{1 + z^{-1} + \ldots + z^{-M+1}}{M} X$$

where Y is a filter output, X is a filter input, z is an operator and M is the number of data to be used in the moving average.

8. A stability compensating circuit of an actuator system including an actuator connected to an object to be controlled and a secondary vibrational term, comprising:
  means to generate a command signal;
  means to generate deviation signals from the sum of said command signal and a feedback signal from said actuator; and
  a digital filter to which said deviation signal is inputted and which averages said deviation signals at intervals of a moving average time of said filter, said moving average time being in the vicinity of a vibration period of said actuator system at the time of resonance;
  the averaged deviation signal being supplied to said actuator so that the stability of said actuator system is compensated.

9. A stability compensating circuit as set forth in claim 8, which further comprises a digital-to-analog converter provided between said digital filter and said actuator, said digital-to-analog converter converting said averaged deviation signal into an analog signal which is supplied to said actuator.

10. A stability compensating circuit as set forth in claim 8, wherein said actuator comprises a hydraulic cylinder.

11. A stability compensating circuit as set forth in claim 8, wherein said actuator comprises an electrically driven actuator.

12. A stability compensating circuit as set forth in claim 8, wherein said object to be controlled is a control surface of an aircraft.

13. A stability compensating circuit as set forth in claim 8, wherein said moving average time of said filter is a predetermined time substantially equal to a vibration period of said actuator system at the time of resonance.

14. A stability compensating circuit as set forth in claim 8, wherein said moving average time of said filter is a predetermined time more than a vibration period of said actuator system at the time of resonance.

15. A stability compensating circuit as set forth in claim 8, wherein said digital filter has a function as a moving average filter and has a transmission characteristic expressed by the following equation:

$$Y = \frac{1 + z^{-1} + \ldots + z^{-M+1}}{M} X$$

where Y is a filter output, X is a filter input, z is an operator and M is the number of data to be used in the moving average.

* * * * *